Patented Dec. 14, 1937

2,101,876

UNITED STATES PATENT OFFICE 2,101,876

COMPOSITE FILM AND METHOD OF MAKING

Clyde Scott, Newark, N. J.

No Drawing. Application April 14, 1933
Serial No. 666,211

30 Claims. (Cl. 18—59)

This invention relates to a novel composite film and its manufacture. The composite film comprises two or more layers or laminae which are built up to form a transparent or translucent film having new, improved, and advantageous properties. This film is found to be insoluble in water and in fact impervious to water. The film is also highly resistant to the passage of water, vapor and mild acids and alkalis. It is also found that the film is highly repellent to oils and greases. A film manufactured according to the following description is sufficiently stable to permit being handled under normal conditions in sheets or rolls and can be stored indefinitely without deterioration. During storage and handling the material does not crack, chip, peel or otherwise allow the separation of the layers. Under such normal conditions the composite film is not tacky or adhesive so that no special precautions are required in handling. However, the particular constitution of the layers is such that the film may by the action of heat and pressure, be caused to adhere most tenaciously and with complete uniformity over its entire surface to other material such as paper, fabrics, leather, wood, metal or the like. This adherence of the film to sheets or other objects is of such intimate nature as to merit description as a process of welding.

When this film is used as a coating in the manner above indicated, it has the property of being water-proof and substantially proof against the absorption of vapors.

The composite film, therefore, lends itself readily to wide use, for packing many articles which it is desired to protect either in their content of moisture, aroma or the like, or where it is important to protect them from acquiring undesirable moisture, vapors, odors, oils or the like. Among such uses is the wrapping of parcels of cigars, cigarettes, candies, confections, perishable bakery goods, and foodstuffs.

Wrappers for such goods and articles may be made directly from the film, either side of which may be brought in direct contact with the packaged material without detriment to the latter. Alternatively the products may be put up in paper or cardboard containers which in turn may be wrapped in the composite film.

In either event the package may be readily and effectively sealed by uniting the free edges of the film together by heat and pressure or against the package itself whereupon the two parts of the film thus brought in contact or the film and package are autogenously sealed or welded.

In instances where it is desired to use plain or printed paper or other forms of wrapping for the purpose of reinforcement, ornamentation or the like, this composite film may be attached to and form an integral part of such containers, all or part thereof, before their ultimate fabrication. In other words, a paper package may have a coextensive layer formed of this novel composite film on one or both sides. By reason of its peculiar adhesive or welding property the film in this case becomes not only a water and vapor-proof coating for the package itself but is marked by other advantages.

One of these advantages is the fact that any ornamentation, printing or the like which is on the material of the package rather than on the exposed surface of the film itself, even though the ornamentation decoration or embellishment is made in water soluble colors or inks, will be rendered substantially odor-proof, water- and moisture-proof while at the same time the printed and color effect is enhanced and intensified and permanently fixed.

Where such containers are provided with openings or windows the sheet of film may extend integrally over these openings. This provides for a transparent protective film fitting closely around and being welded to the edges of the openings and insuring against loss of the contents from the package through spilling or seepage.

Incidental to the use of this film as a covering for ornamented sheets of paper or the like, the film may also serve as a transfer medium for the ornamentation of the paper. It is characteristic of this film that it will pick up the ink or dye from the surface of the paper and retain these materials. The fiber of the paper may be in fact removed by soaking and scraping and leave the printed matter a part of the film thus forming a transparency which due to the nature of the film is otherwise unaffected by water or ordinary vapors.

The essential features of this composite film and the method of its manufacture are illustrated in the following typical and preferred examples.

Essentially the film is made of two or more layers or laminae. One of these is a base film or layer and on this is one or more superifical layers or coatings.

I prefer to form the base layer from a composition of the following ingredients in parts by weight:

Example No. 1

| | |
|---|---|
| Cellulose acetate | 78 |
| Dimethyl phthalate | 2 |
| Triphenyl phosphate | 10 |
| Synthetic resin of the glycerol phthalate type | 10 |
| Acetone to form 25% solution | |

Example No. 2

| | |
|---|---|
| Cellulose acetate | 100 |
| Acetone | 900 |

Example No. 3

| | |
|---|---|
| Cellulose acetate | 80–90 |
| Resin | 20–10 |
| Acetone (quantity sufficient) | |

Example No. 4

| | |
|---|---|
| Cellulose acetate | 65–90 |
| Phosphoric acid ester solvent as needed | 35–10 |

Example No. 5

| | |
|---|---|
| Cellulose acetate | 50–90 |
| Diethyl phthalate | 2–10 |
| Diethylene-glycol monoethyl ether | 2–10 |
| Phosphoric acid ester solvent as needed | 35–5 |

The above composition is used to form a solution which may be cast in sheets or films due to the ready evaporation of the solvent used. The casting operation is carried out on a smooth surface over which the solution is spread thinly and allowed to evaporate to form the base lamina.

The second or resin lamina of the film is formed from a solution of appropriate natural or synthetic resins. Examples of solutions of this type are the following:

Example A

Bleached, bone-dry, wax-free shellac in alcohol.

Example B

Shellac 50–90 parts; synthetic resin such as polymerized vinyl compounds 10–50 parts and a solvent such as alcohol and acetone mixed.

Example C

Shellac 50–90; synthetic resin 5–45; non-volatile plasticizing solvent 5–25.

Example D

Phenol-formaldehyde resin in solvent such as toluol.

Example E

Oil modified glycerol-phthalate resin in solvents preferably esters.

Example F

Drying oil modified glycerol-phthalate resin in solvents preferably coal tar hydrocarbons.

Example G

Polymerized vinyl compound in suitable volatile solvent.

Example H

Polymerized vinyl compounds 75–90 parts; modified glycerol-phthalate resin 10–25 and an optional solvent preferably coal tar hydrocarbons.

Example I

Polymerized vinyl compound 75–90 parts; cumaron resin 10–25 and an optional solvent.

Example J

Polymerized vinyl compound 65–90 parts; diethyl phthalate 5–25; phosphoric acid ester 5–25 and an optional solvent.

Example K

Polymerized vinyl compound 86–90 parts; modified glycerol-phthalate resin 5–10; bee's wax 1–5 and an optional solvent.

The resin solution of the type last indicated is deposited upon the base film while the latter is still on a suitable casting surface or support and both layers then allowed to dry thoroughly before removal.

The second solution may be deposited upon the base layer after the latter has been completely dried of its solvents although alternatively some residue of the solvent may remain in the base layer when the second or superficial layer is deposited. In either event the drying is carried to a thorough conclusion.

It is important to bear in mind that a common solvent is used in casting both layers as it is due in some degree to this that the layers establish firm coherence.

After being dried thoroughly the composite film is stripped from the casting surface and may be packed for indefinite storage. When dry this film is non-tacky and can even be rolled up with its surfaces in tight contact without adhering one to the other so long as no undue heat or pressure is applied.

The film so made is soft and pliable without need of addition of plasticizers or softening agents in the resin other than those above indicated. Consequently, the film may be rolled up, cut, stacked and otherwise handled without danger of sticking, or chipping, cracking or peeling.

A wide variety of uses for this composite film has already been indicated and will be apparent from its properties. It may be used alone as a protection or wrapping for articles and it may be used as a coating for ornamented surfaces which it is desired to enhance or to protect from moisture or the accumulation of undesirable vapors or odors; or it may be used for spotting in.

Further treatment of this composite film may include a third and subsequent coatings by which the film is covered thinly with a solution of wax, wax and resin, rubber, gums, phenol-formaldehyde resins, synthetic resins, drying oils and spirit varnish, either alone or in various combinations.

Such a composite film is practically of the same thickness of other films the extra laminae not adding appreciably to its thickness. While not self-supporting, yet the added laminae contribute properties previously attained only at the expense of much thicker films.

Due to the thinness of the laminae, the composite film may be applied interchangeably with either the base or the coated surface in contact with other materials.

Due to the dry condition of the composite film and the readiness with which the superficial layer becomes tacky or adherent under pressure and heat, it may be applied to sheets of paper or the like in rapid mechanical operations of printing either in sheet form, roll or web.

While I have illustrated the preferred constitution and mode of manufacture of my invention, the same is merely illustrative of the many equivalents possible and the scope of the invention is to be limited only by the following claims.

What I claim is:—

1. In a process of making by casting and evaporating method heat-and-pressure sensitive composite films of predetermined thickness adapted for welding and wrapping purposes steps that comprise depositing a thin layer of film forming solution comprising a cellulose ester uniformly on a smooth casting surface to form a lamina so thin as to be incapable of removal therefrom in the ordinary manner when dry, depositing thereon a thin layer of film forming solution comprising a thermoplastic heat-and-pressure sensitive adhesive composition to form a translucid attached coextensive lamina so thin as to be incapable of supporting itself by its own strength when dry, evaporating volatile solvent therefrom and then removing the composite film so formed from said casting surface.

2. In the process of making by casting and evaporating method heat-and-pressure sensitive water repellent and moisture-vapor repellent composite film adapted for welding or wrapping purposes, steps comprising depositing a layer of film forming solution comprising cellulose acetate and plasticizer dissolved in volatile solvent uniformly on a smooth casting surface to form a base layer so thin as to be incapable of removal therefrom in the ordinary manner when dry, depositing thereon a layer of film forming solution comprising a water repellent and moisture-vapor repellent thermo-adhesive compound, said compound comprising one or more resins and wax, to form an attached coextensive heat-and-pressure sensitive layer so thin as to be incapable of supporting itself by its own strength when dry, evaporating volatile solvent and removing the composite film so formed from said casting surface.

3. In the process of making by casting and evaporating method heat-and-pressure sensitive water repellent and moisture-vapor repellent composite film adapted for welding or wrapping purposes, steps comprising depositing a layer of film forming solution comprising cellulose ester dissolved in volatile solvent uniformly on a smooth casting surface to form a base layer so thin as to be incapable of removal therefrom in the ordinary manner when dry, depositing thereon a layer of film forming solution comprising a water repellent and moisture-vapor repellent thermo-adhesive compound, said compound comprising one or more resins and plasticizer, to form an attached coextensive heat-and-pressure sensitive layer so thin as to be incapable of supporting itself by its own strength when dry, evaporating volatile solvent and removing the film so formed from said casting surface.

4. In the process of making by casting and evaporating method heat-and-pressure sensitive water repellent and moisture-vapor repellent composite film adapted for welding or wrapping purposes, steps comprising depositing a layer of film forming solution comprising cellulose acetate dissolved in volatile solvent uniformly on a smooth casting surface to form a base layer so thin as to be incapable of removal therefrom in the ordinary manner when dry, evaporating volatile solvent therefrom, depositing thereon a layer of film forming solution comprising a water repellent and moisture-vapor repellent thermo-adhesive compound dissolved in suitable volatile solvent, said compound comprising wax and two or more resins including polymerized vinyl ester, to form an attached coextensive heat-and-pressure sensitive layer so thin as to be incapable of supporting itself by its own strength when dry, evaporating volatile solvent, removing the film so formed from said casting surface and applying to one or both sides thereof a solution of compound comprising one or more non-absorbent substances resistant to mild acids, alkalis and the like, said compound comprising wax.

5. In a process of making by casting and evaporating method composite films of extreme thinness steps that comprise depositing a thin layer of film forming solution comprising a cellulose ester uniformly on a smooth casting surface to form a lamina so thin as to be incapable of removal therefrom in the ordinary manner when dry, depositing thereon a thin layer of film forming solution comprising a water repellent and moisture-vapor repellent thermoplastic adhesive compound and a wax to form a solid substantially permanently bonded coextensive heat-and-pressure sensitive lamina, evaporating volatile solvent therefrom and finally removing said film from said casting surface, said composite film being adapted for application to other material through the agency of heat and pressure.

6. In the process of making by casting and evaporating method heat-and-pressure sensitive water repellent and moisture-vapor repellent composite film adapted for welding or wrapping purposes, steps comprising depositing a layer of film forming solution comprising cellulose ester and resin dissolved in volatile solvent uniformly on a smooth casting surface to form a base layer so thin as to be incapable of removal therefrom in the ordinary manner when dry, depositing thereon a layer of film forming solution comprising a water repellent and moisture-vapor repellent thermoplastic adhesive compound, said compound comprising one or more resins, to form a firmly bonded coextensive heat-and-pressure sensitive layer, evaporating volatile solvent and removing the composite film so formed from said casting surface.

7. In a process of making by casting and evaporating method composite film of predetermined thinness steps that comprise depositing a thin layer of film forming solution comprising a plasticized cellulose ester uniformly on a smooth casting surface to form a lamina so thin as to be incapable of removal therefrom in the ordinary manner when dry, evaporating volatile solvent, depositing upon said base upon said casting surface a thin layer of film forming solution comprising a thermoplastic heat-and-pressure sensitive plasticized adhesive composition to form a solid attached coextensive heat-and-pressure sensitive lamina, evaporating volatile solvent therefrom to adapt said film for removal from said surface and to further adapt said film for coverage with one or more solutions comprising wax.

8. The process of making by casting and evaporating method heat-and-pressure sensitive water repellent and moisture-vapor repellent composite film adapted for welding or wrapping purposes, comprising depositing a layer of film forming solution comprising cellulose ester and plasticizer dissolved in volatile solvent uniformly on a smooth casting surface to form a base layer so thin as to be incapable of removal therefrom in the ordinary manner when dry, depositing thereon a layer of film forming solution comprising a water repellent and moisture-vapor repellent thermo-adhesive compound, said compound comprising one or more resins and a plasticizer, to form a solid firmly bonded coextensive heat-and-pressure sensitive layer, evaporating volatile solvent, removing the film so formed from said casting surface and applying to one or both sides thereof a solution of compound comprising two or more non-absorbent substances resistant to mild acids, alkalis and the like, said compound comprising resin and wax.

9. In the process of making by casting and evaporating method heat-and-pressure sensitive water repellent and moisture-vapor repellent composite film adapted for welding or wrapping purposes, comprising depositing a layer of film forming solution comprising cellulose ester and resin dissolved in volatile solvent uniformly on a smooth casting surface to form a base layer so thin as to be incapable of removal therefrom in the ordinary manner when dry, depositing thereon a layer of film forming solution comprising a water repellent and moisture-vapor repellent thermo-adhesive compound, said compound comprising one or more resins, to form a solid firmly bonded coextensive heat-and-pressure sensitive layer, evaporating volatile solvent, removing the film so formed from said casting surface and applying to one or both sides thereof a solution of compound comprising two or more non-absorbent substances resistant to mild acids, alkalis and the like, said compound comprising resin and moisture-vapor repellent wax.

10. As an article a composite film adapted for welding or wrapping purposes comprising a base layer, said layer comprising cellulose acetate and plasticizer, upon which is deposited and autogenously bonded thereto a heat-and-pressure sensitive layer of thermo-adhesive compound comprising one or more resins and plasticizer.

11. As an article a composite film adapted for welding or wrapping purposes comprising a base layer, said layer comprising cellulose ester and resin, upon which is deposited and autogenously bonded thereto a heat-and-pressure sensitive layer of thermo-adhesive compound comprising one or more resins.

12. As an article a composite film adapted for welding or wrapping purposes comprising a base layer, said layer comprising cellulose ester, upon which is deposited and autogenously bonded thereto a heat-and-pressure sensitive layer of thermo-adhesive compound comprising one or more resins and bee's wax.

13. As an article adapted for welding and wrapping purposes a relatively thin film comprising a base layer of cellulose ester, a plasticizer and a resin, upon which is deposited and united thereto a heat-and-pressure sensitive layer comprising polymerized vinyl ester substantially free from volatile solvent.

14. As a water repellent and moisture-vapor repellent article adapted for welding or wrapping purposes a composite film comprising a translucid base layer, said layer comprising cellulose acetate, plasticizer and resin, upon which is deposited and autogenously bonded thereto a heat-and-pressure sensitive layer of thermo-adhesive resinous compound, said film having a firmly bonded substantially non-absorbent moisture-vapor repellent surface coating on one or both sides thereof, said surface coating comprising one or more materials resistant to mild acids, alkalis and the like, said film being adapted on one side for bonding to other material under the influence of heat and pressure.

15. As a water repellent and moisture-vapor repellent article adapted for welding or wrapping purposes a composite film comprising a translucid base layer, said layer comprising cellulose ester, upon which is deposited and autogenously bonded thereto a heat-and-pressure sensitive layer of thermo-adhesive compound, said compound comprising one or more resins and wax, said composite film comprising a surface coating on one or both sides thereof, said surface coating comprising one or more substantially non-absorbent materials including wax.

16. As a water repellent and moisture-vapor repellent article adapted for welding and wrapping purposes a composite film comprising a base layer, said layer comprising cellulose ester, said base layer being characterized by such extreme thinness as to be incapable of supporting itself by its own strength when dry, upon which is deposited and united thereto a heat-and-pressure sensitive layer of thermo-adhesive resinous compound, said heat-and-pressure sensitive layer being characterized by such extreme thinness as to be incapable of supporting itself by its own strength when dry.

17. As a water repellent and moisture-vapor repellent article adapted for welding and wrapping purposes a relatively thin film comprising a translucid base layer comprising thermoplastic material, said base layer being characterized by such extreme thinness as to be incapable of supporting itself by its own strength, upon which is united thereto a layer of heat-and-pressure sensitive thermo-adhesive compound comprising a wax, said second named layer being characterized by such extreme thinness as to be incapable of supporting itself by its own strength.

18. As a water repellent and moisture-vapor repellent article adapted for welding and wrapping purposes a composite film comprising a base layer, said layer comprising cellulose ester, said base layer being characterized by such extreme thinness as to be substantially incapable of supporting itself by its own strength when dry, upon which is deposited and united thereto a heat-and-pressure sensitive layer of thermo-adhesive compound, said compound comprising resinous material and plasticizer, said heat-and-pressure sensitive layer being characterized by such extreme thinness as to be substantially incapable of supporting itself by its own strength when dry.

19. As an article adapted for welding and wrapping purposes a relatively thin film comprising a thin base layer of cellulosic compound, a plasticizer and a resin, said layer being of such extreme thinness as to be incapable of supporting itself by its own strength, upon which is deposited and united thereto a thin heat-and-pressure sensitive layer comprising polymerized vinyl compound, said layer being of such extreme thinness as to be incapable of supporting itself by its own strength.

20. As a water repellent and moisture-vapor repellent article adapted for welding and wrapping purposes a composite film comprising a base layer, said layer comprising cellulose ester and plasticizer, said base layer being of such extreme thinness as to be substantially incapable of supporting itself by its own strength when dry, upon which is deposited and united thereto a heat-and-pressure sensitive layer of thermo-adhesive compound, said compound comprising one or more resins, said heat-and-pressure sensitive layer being characterized by such extreme thinness as 21. As a water repellent and moisture-vapor repellent article adapted for welding and wrapping purposes a composite film comprising a base layer, said layer comprising cellulose acetate and plasticizer, said base layer being characterized by such extreme thinness as to be incapable of supporting itself by its own strength when dry, upon which is deposited and united thereto a heat-and-pressure sensitive layer of thermo-adhesive compound, said compound comprising one or more resins including polymerized vinyl acetate, said heat-and-pressure sensitive layer being characterized by such extreme thinness as to be substantially incapable of supporting itself by its own strength when dry, said film having a firmly bonded substantially non-absorbent moisture-vapor repellent surface coating on one or both sides thereof, said surface coating comprising two or more materials resistant to mild acids, alkali, oil, grease and the like, said materials comprising wax and resin.

22. As an article adapted for welding and wrapping purposes a relatively thin film comprising a thin base layer of cellulosic compound, plasticizer and resin, said layer being of such extreme thinness as to be incapable of supporting itself by its own strength, upon which is deposited and united thereto a heat-and-pressure sensitive layer comprising thermo-adhesive compound.

23. As a water repellent and moisture-vapor repellent article adapted for welding or wrapping purposes a composite film comprising a base layer, said layer comprising cellulose ester, said base layer being characterized by such extreme thinness as to be substantially incapable of supporting itself by its own strength when dry, upon which is deposited and united thereto a heat-and-pressure sensitive layer of thermo-adhesive compound, said compound comprising one or more resinous substances including bleached bone-dry wax-free shellac.

24. As a water repellent and moisture-vapor repellent article adapted for welding or wrapping purposes a composite film comprising a base layer, said layer comprising cellulose ester, said base layer being characterized by such extreme thinness as to be substantially incapable of supporting itself by its own strength when dry, upon which is deposited and united thereto a heat-and-pressure sensitive layer of thermo-adhesive compound, said compound comprising one or more resinous substances including phenol-aldehyde resin.

25. As a water repellent and moisture-vapor repellent article adapted for welding or wrapping purposes a composite film comprising a base layer, said layer comprising cellulose ester, said base layer being characterized by such extreme thinness as to be substantially incapable of supporting itself by its own strength when dry, upon which is deposited and united thereto a heat-and-pressure sensitive layer of thermo-adhesive compound, said compound comprising one or more resinous substances including glycerol-phthalate resin.

26. As a water repellent and moisture-vapor repellent article adapted for welding or wrapping purposes a composite film comprising a base layer, said layer comprising cellulose ester, said base layer being characterized by such extreme thinness as to be substantially incapable of supporting itself by its own strength when dry, upon which is deposited and united thereto a heat-and-pressure sensitive layer of thermo-adhesive compound, said compound comprising one or more resinous substances including cumar resin.

27. As a water repellent and moisture-vapor repellent article adapted for welding or wrapping purposes a composite film comprising a base layer, said layer comprising cellulose ester, said base layer being characterized by such extreme thinness as to be substantially incapable of supporting itself by its own strength when dry, upon which is deposited and united thereto a heat-and-pressure sensitive layer of thermo-adhesive compound, said compound comprising two or more substances including a compound having the group $CH_2=CH$ therein.

28. As a water repellent and moisture-vapor repellent article adapted for welding or wrapping purposes a composite film comprising a base layer, said layer comprising cellulose ester, said base layer being characterized by such extreme thinness as to be substantially incapable of supporting itself by its own strength when dry, upon which is deposited and united thereto a heat-and-pressure sensitive layer of thermo-adhesive compound, said compound comprising wax and one or more resins including polymerized vinyl acetate, said film having a firmly bonded substantially non-absorbent moisture-vapor repellent surface coating on one or both sides thereof, said surface coating comprising one or more materials including wax.

29. As a water repellent and moisture-vapor repellent article adapted for welding or wrapping purposes a composite film comprising a base layer, said layer comprising cellulose acetate, dimethyl phthalate, triphenyl phosphate and glycerol-phthalate resin, upon which is deposited and united thereto a heat-and-pressure sensitive layer of thermo-adhesive compound, said compound comprising resinous material and polymerized vinyl acetate, said heat-and-pressure sensitive layer being characterized by such extreme thinness as to be substantially incapable of supporting itself by its own strength when dry.

30. As a water repellent and moisture-vapor repellent article adapted for welding or wrapping purposes a composite film comprising a base layer, said layer comprising cellulose acetate, diethyl phthalate, diethylene-glycol monoethyl ether and phosphoric acid ester, upon which is deposited and united thereto a heat-and-pressure sensitive layer of thermo-adhesive compound, said compound comprising polymerized vinyl ester and diethyl phthalate, said heat-and-pressure sensitive layer being characterized by such extreme thinness as to be substantially incapable of supporting itself by its own strength when dry, said film having a firmly bonded substantially non-absorbent moisture-vapor repellent surface coating on one or both sides thereof, said surface coating comprising two or more materials resistant to mild acids, alkali, oil, grease and the like, said materials comprising wax and resin.

CLYDE SCOTT.